United States Patent [19]

Irikura

[11] Patent Number: 4,880,070
[45] Date of Patent: Nov. 14, 1989

[54] TRANSMISSION ASSEMBLY FOR SELF-PROPELLED WORKING VEHICLES

[75] Inventor: Koji Irikura, Nishinomiya, Japan

[73] Assignee: Kanzaki Kokyukoki Mfg. Co., Ltd., Japan

[21] Appl. No.: 283,629

[22] Filed: Dec. 13, 1988

[30] Foreign Application Priority Data

Dec. 29, 1987 [JP] Japan ............................... 62-332757

[51] Int. Cl.$^4$ ...................... B60K 17/28; F16H 37/08
[52] U.S. Cl. ................................................. 180/53.1
[58] Field of Search .................. 180/53.1, 53.62, 53.7, 180/70.1; 74/15.6, 15.63, 15.8, 15.2

[56] References Cited

U.S. PATENT DOCUMENTS

| | | | |
|---|---|---|---|
| 3,613,815 | 10/1981 | Meylink | 180/53.1 |
| 4,051,915 | 10/1977 | Behrens | 180/53.1 |
| 4,187,924 | 2/1980 | Deschamps | 180/53.1 |
| 4,579,183 | 4/1986 | Irikura et al. | |

Primary Examiner—Richard A. Bertsch

[57] ABSTRACT

In a vehicle transmission assembly comprising a transmission casing (15) which supports axles (16) of forcedly driven rear wheels (12) and includes therein a rear-PTO shaft (18) and mid-PTO shaft (19), first input shaft (28) of a lower level and second input shaft (27) of a higher level for transmitting power into the transmission casing are provided such that the first input shaft is located aside in a direction across the casing. The first input shaft is connected drivingly to the wheel axles through a change speed gearing (31) disposed at a relatively high level, differential gearing (32) and final speed-reduction meshing gears (72, 73). A PTO-clutch (40) is disposed on the rear of the transmission casing between a drive shaft (38), co-axial with and coupled to the second input shaft, and a hollow clutch shaft (39) mounted rotatably on the drive shaft. The clutch shaft is connected drivingly to the respective PTO-shafts through a PTO-shaft drive assembly which is disposed at a rear end portion within the transmission casing and includes a PTO-selecting clutch (47). A compactness of the transmission assembly and transmission casing is assured owing to the arrangement of change speed gearing (31) and PTO-clutch (41).

12 Claims, 6 Drawing Sheets

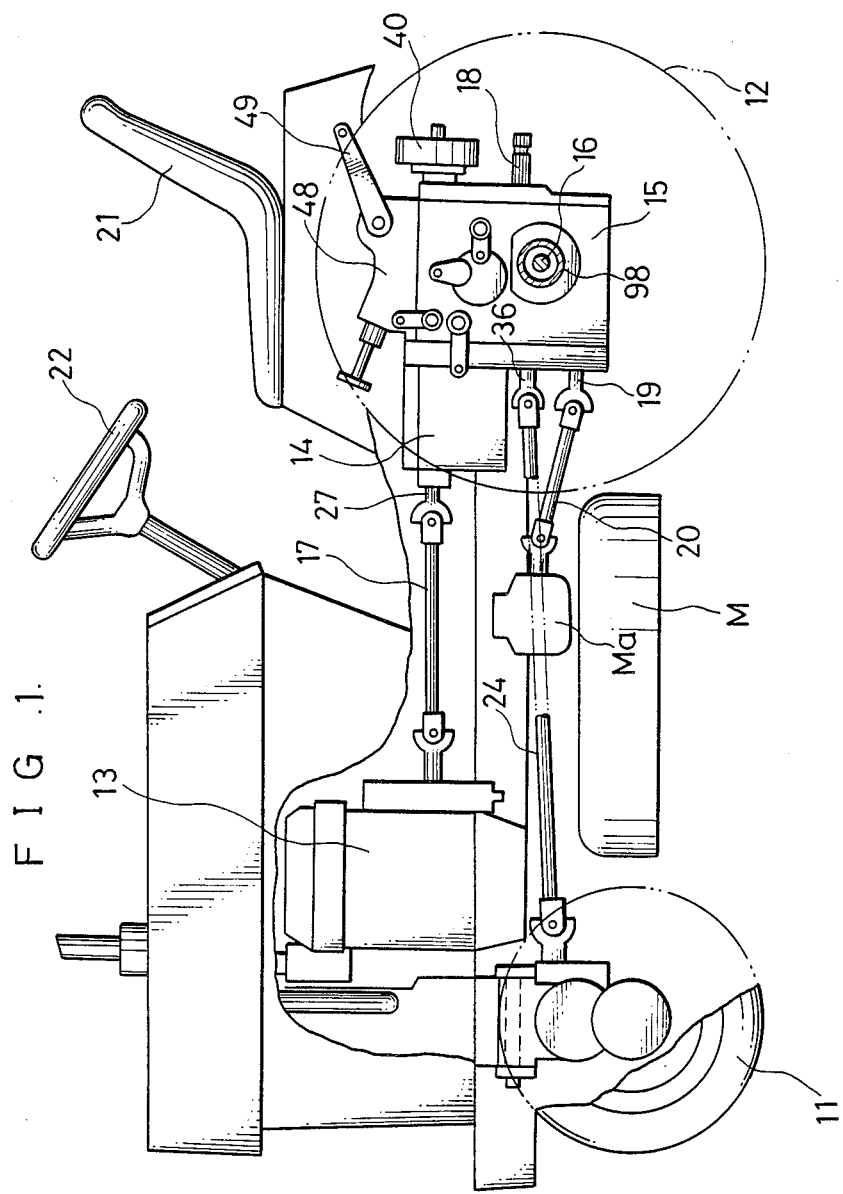

TRANSMISSION ASSEMBLY FOR SELF-PROPELLED WORKING VEHICLES

FIELD OF THE INVENTION

This invention relates to a transmission assembly for self-propelled working vehicles for use, for example, in earth-moving, mowing, reaping or goods loding operations.

More particularly, the present invention relates to a transmission assembly for a self-propelled working vehicle, wherein axles of left and right rear wheels are supported rotatably by a transmission casing disposed between the left and right rear wheels, and wherein the transmission casing includes therein a rear-PTO shaft, extending rearwardly from the transmission casing at a mid level of the casing, and a mid-PTO shaft extending forwardly from the transmission casing at a low level of the casing.

BACKGROUND OF THE INVENTION

As a transmission assembly of the type set forth above, there is known from U.S. Pat. No. 4,579,183 a transmission assembly in which almost all of the space within a transmission casing is utilized effectively so as to reduce the size of the casing.

In the transmission assembly disclosed in this U.S. Patent, a hydrostatic transmission is mounted on the front of a transmission casing at an upper side of a mid-PTO shaft which extends forwardly from the casing. Motor shaft of a hydraulic motor which is located at a lower side in the hydrostatic transmission is used as an input shaft for transmitting the wheel-driving power into the transmission casing, whereas pump shaft of a hydraulic pump which is located at an upper side in the hydrostatic transmission is projected rearwardly into the transmission casing and is used as an input shaft for transmitting the PTO shaft-driving power into the casing.

Within the transmission casing, a wheel drive assembly is arranged at a lower half in the casing. This wheel drive assembly comprises a change speed gearing disposed between a drive shaft, which is arranged at a front portion within the transmission casing and at a level lower than that of the motor shaft and is drivenly connected to the motor shaft via meshing gears, and a speed-change shaft which is arranged at a front portion within the transmission casing and at a level lower than that of the drive shaft. The wheel drive assembly further comprises a differential gearing which is arranged behind the change speed gearing and is connected drivenly to the speed-change shaft. Left and right output shafts of the differential gearing are disposed co-axially with left and right rear wheel axles and are connected drivingly to such axles through left and right speed-reduction planet gearings, respectively. In addition, an output shaft for front wheel-driving power is also arranged at a front portion within the transmission casing and is connected drivenly to the speed-change shaft. Such output shaft is disposed such that it extends forwardly from the transmission casing at a location spaced laterally from a mid-PTO shaft which also extends forwardly from the casing.

On the other hand, a PTO shaft drive assembly is arranged at an upper half within the transmission casing and includes, as a drive shaft, a transmission shaft which is arranged coaxially with and coupled to the pump shaft referred to before. Below this transmission shaft are arranged a clutch shaft and intermediate shaft which are spaced from each other in a direction across the transmission casing. On the clutch shaft are mounted a fluid-actuated PTO-clutch of the multidisk type for connecting between the transmission shaft and clutch shaft, a brake for stopping an inertial rotation of the clutch shaft quickly when the PTO-clutch is disengaged, and a PTO-selecting clutch for transmitting rotation of the clutch shaft selectively to a rear-PTO shaft and to the mid-PTO shaft. The rear-PTO shaft which extends rearwardly from the transmission casing at a mid level of the casing is driven to rotate by one of a pair of clutch gears of the PTO-selecting clutch via the intermediate shaft, whereas the mid-PTO shaft is driven to rotate by the other clutch gear via a gear train which is disposed at one side of the front portion within the transmission casing.

In the transmission assembly disclosed in U.S. Pat. No. 4,579,183 in which the pump shaft and motor shaft of a hydrostatic transmission are used respectively for input shafts for transmitting the PTO shaft-driving power and wheel-driving power into a transmission casing, the PTO-shaft drive assembly and wheel drive assembly are concentratedly arranged respectively at an upper half and at a lower half within the transmission casing in correspondence with a higher level of the pump shaft and a lower level of the motor shaft in the hydrostatic transmission so that the transmission mechanism within the transmission casing is arranged in a compact fashion so as to reduce the size of the casing. However, such transmission assembly still involves some problems which will be detailed hereinafter.

With respect to the wheel drive assembly arranged at a lower half within the transmission casing, the drive shaft and speed-change shaft set forth before are arranged below the motor shaft successively in that order at a central portion of the lateral width of the transmission casing in correspondence with the arrangement of the motor shaft that it is projected into the transmission casing at such central portion of the width of the casing. Such arrangement of shafts requires a relatively large vertical space for the wheel drive assembly. For reducing such vertical space, it is considered to arrange the drive shaft and speed-change shaft in a laterally spaced relationship so that the speed-change shaft is disposed at substantially the level of the drive shaft. It is, however, difficult to adopt such arrangement of shafts due to a restriction given by the aforestated gear train which connects between the PTO-selecting clutch and mid-PTO shaft. Further, left and right output shafts of the differential gearing which is driven by the speed-change shaft are located at a low level corresponding to the level of the speed-change shaft so that, in a case where such left and right output shafts are connected drivingly to left and right rear wheel axles through left and right speed-reduction gearing each having a pair of meshing spur gears, it is required for securing a vertical space for such meshing spur gears to further enlarge or extend the transmission casing downwardly. From this, it is obliged for avoiding an undue hightening of the transmission casing to arrange the left and right rear wheel axles co-axially with the left and right output shafts of the differential gearing and to connect between such output shafts and axles through left and right final reduction means each consisting of a relatively expensive planet gearing, as is the case in the transmission assembly disclosed in U.S. Pat. No. 4,579,183.

With respect to the PTO-shaft drive assembly, although the aforestated clutch shaft mounting thereon the PTO-clutch, brake and PTO-selecting clutch permits an easy assembling of the clutch mechanism into the transmission casing, such clutch shaft and another shafts associated thereto are lengthy so that axial length of the transmission casing is relatively large.

Object

Accordingly, a primary object of the present invention is to provide a novel transmission assembly for self-propelled working vehicles in which required transmission units are provided with further reducing the size of a transmission casing as compared to the one employed in the prior art assembly referred to above and in which each of a pair of final speed-reduction means may be composed of a pair of meshing spur gears so as to reduce substantially the manufacturing cost.

BRIEF DESCRIPTION OF THE DRAWINGS

In the accompanying drawings,

FIG. 1 is a schematic side view, partially cut away, of a mower tractor in which an embodiment of the transmission assembly according to the present invention is employed;

SUMMARY OF THE INVENTION

Figure 2A:
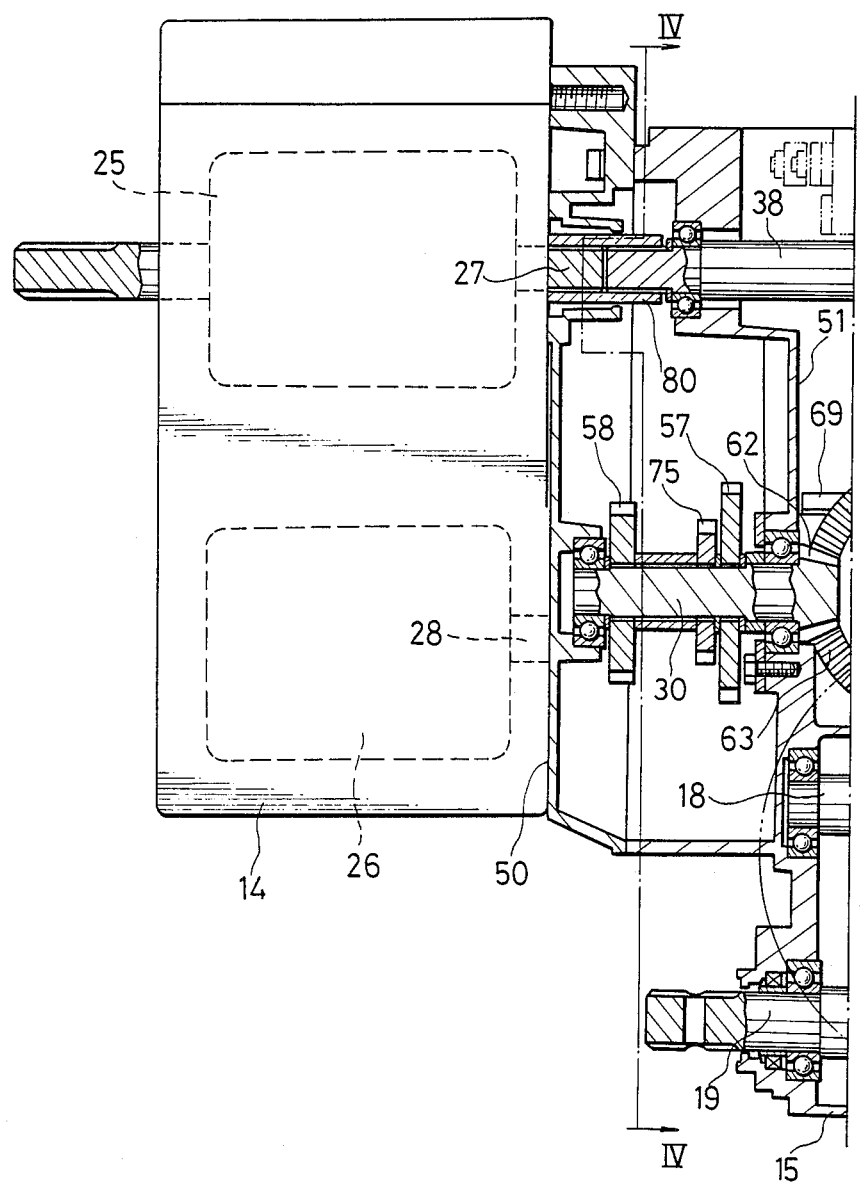
FIG. 2A is a sectional side view, partially developed, of a fronter half of the transmission assembly shown in FIG. 1.

The present invention relates to a transmission assembly for a working vehicle such as shown in FIG. 1, in which axles 16 of left and right rear wheels 12 are supported rotatably by a transmission casing 15 disposed between the left and right rear wheels, and in which the transmission casing 15 includes therein a rear-PTO shaft 18, extending rearwardly from the transmission casing at a mid level of the casing, and a mid-PTO shaft 19 extending forwardly from the transmission casing at a low level of the casing.

According to the present invention, there are provided, as shown in FIGS. 2A to 4, at a front end portion of the transmission casing 15 a first input shaft 28 for transmitting wheel-driving power into the casing and a second input shaft 27 for transmitting PTO shaft-driving power into the casing. As clearly shown in FIG. 4, the second input shaft 27 is disposed at a level higher than that of the first input shaft 28 which in turn is located aside in a direction across the transmission casing 15.

In the transmission assembly shown, a main change speed mechanism 14 for varying wheel-driving speed is mounted on a front of the transmission casing for the purpose of finely controlling the vehicle speed although a change speed gearing for varying wheel-driving speed is provided within the transmission casing 15. Input shaft and output shaft of the main change speed mechanism 14 are projected towards the transmission casing and are used respectively as the second input shaft 27 and first input shaft 28 set forth above. The main change speed mechanism 14 shown is fashioned into a hydrostatic transmission and the pump shaft 27 and motor shaft 28 thereof are used as such second input shaft and first input shaft.

Figure 3:
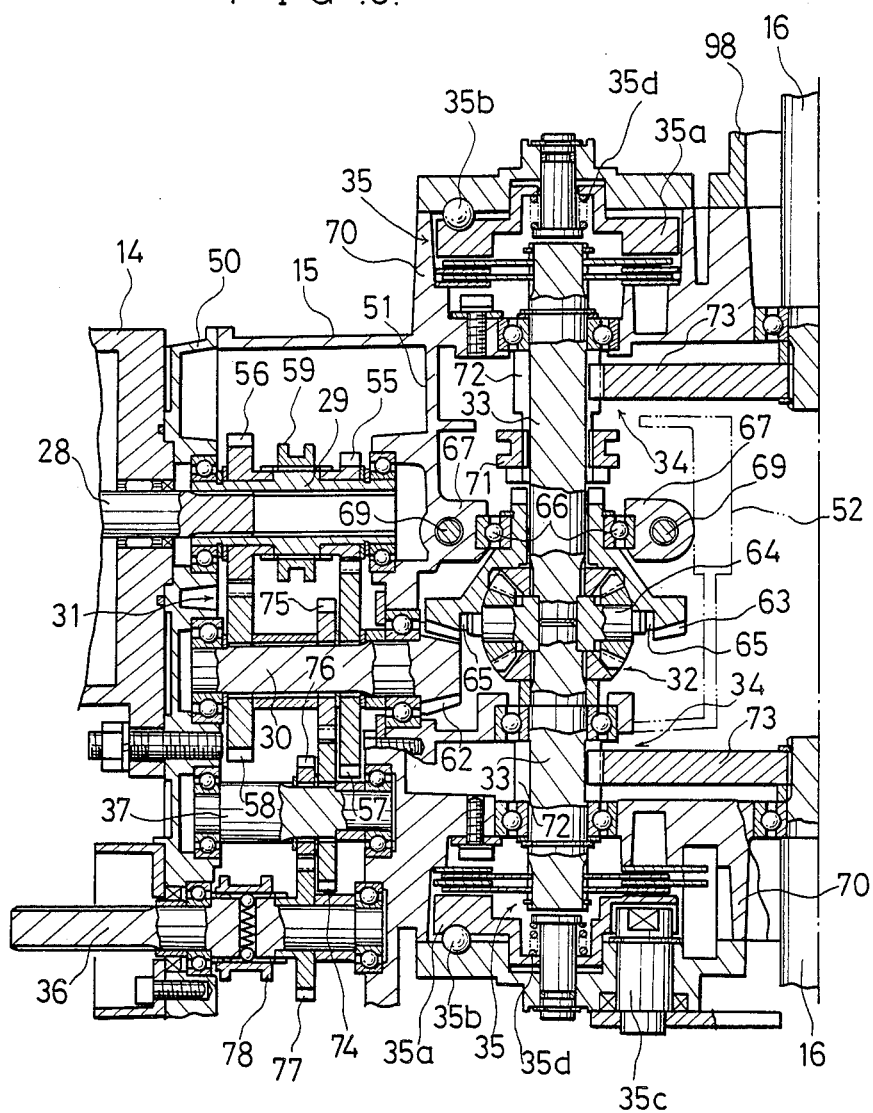
FIG. 3 is a sectional plan view, partially developed, of an essential part of the transmission assembly shown in FIGS. 2A and 2B.
Figure 4:
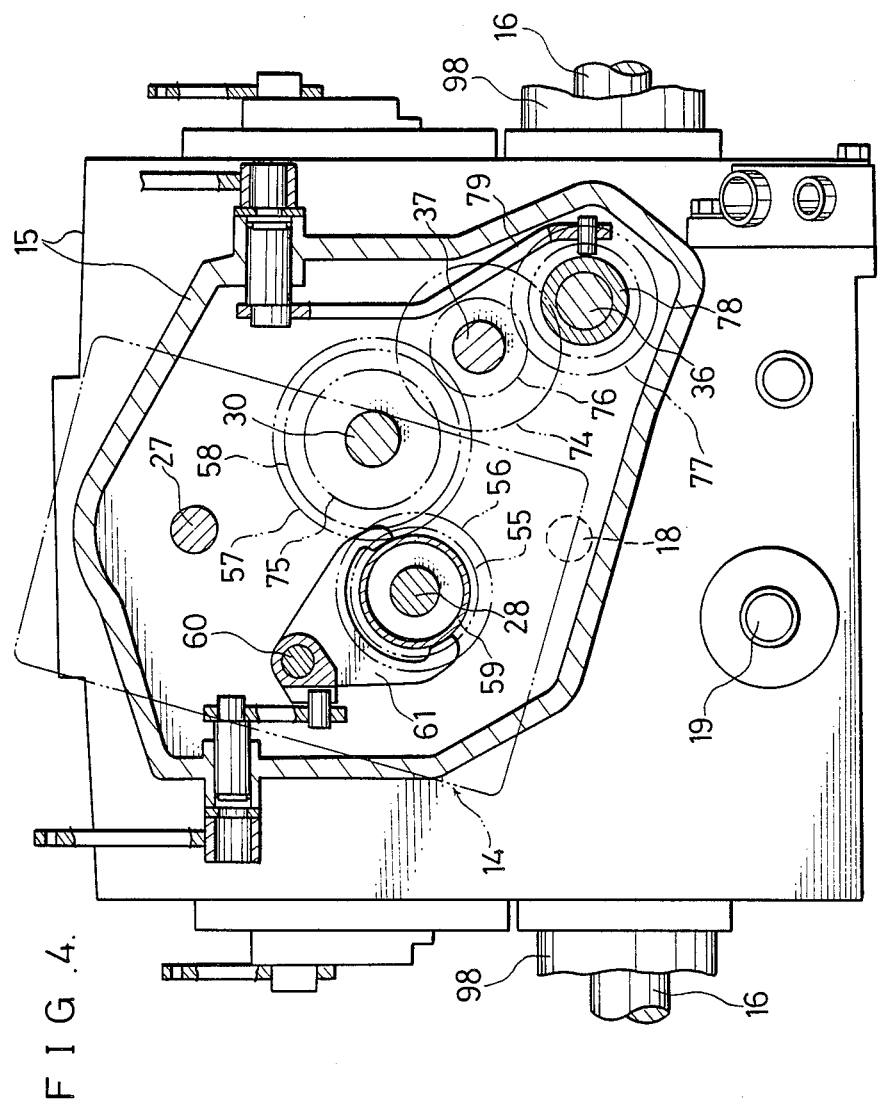
FIG. 4 is a sectional view, partially omitted, taken generally along line IV—IV of FIG. 2A.

A wheel drive assembly is arranged within the transmission casing 15 in a fashion which will be detailed hereinafter. As shown in FIGS. 3 and 4, a speed-change shaft 30 is arranged at a front portion within the transmission casing 15 in a fashion such that the change shaft is located aside in a direction across the transmission casing oppositely from the first input shaft 28 at a level substantially equal to the level of the first input shaft. A change speed gearing 31 is disposed between the first input shaft 28 and change shaft 30, whereas a differential gearing 32 drivenly connected to the change shaft 30 is disposed rearwardly of the change speed gearing 31. Left and right output shafts 33 of the differential gearing 32 are drivingly connected respectively to the left and right rear wheel axles 16 through speed-reduction gearings 34 which are disposed at left and right end portions within the transmission casing 15.

Figure 2B:
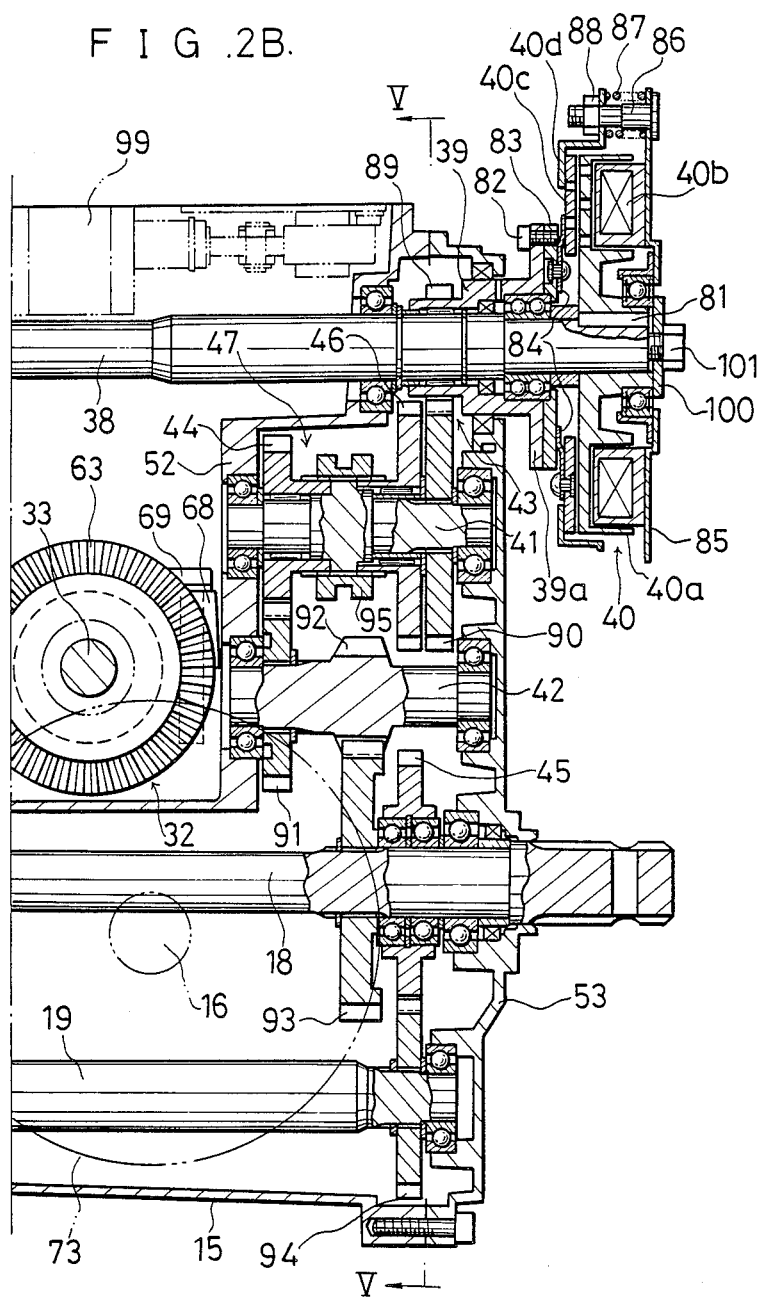
FIG. 2B is a sectional side view, partially developed, of a rearer half of the transmission assembly shown in FIG. 1.
Figure 5:
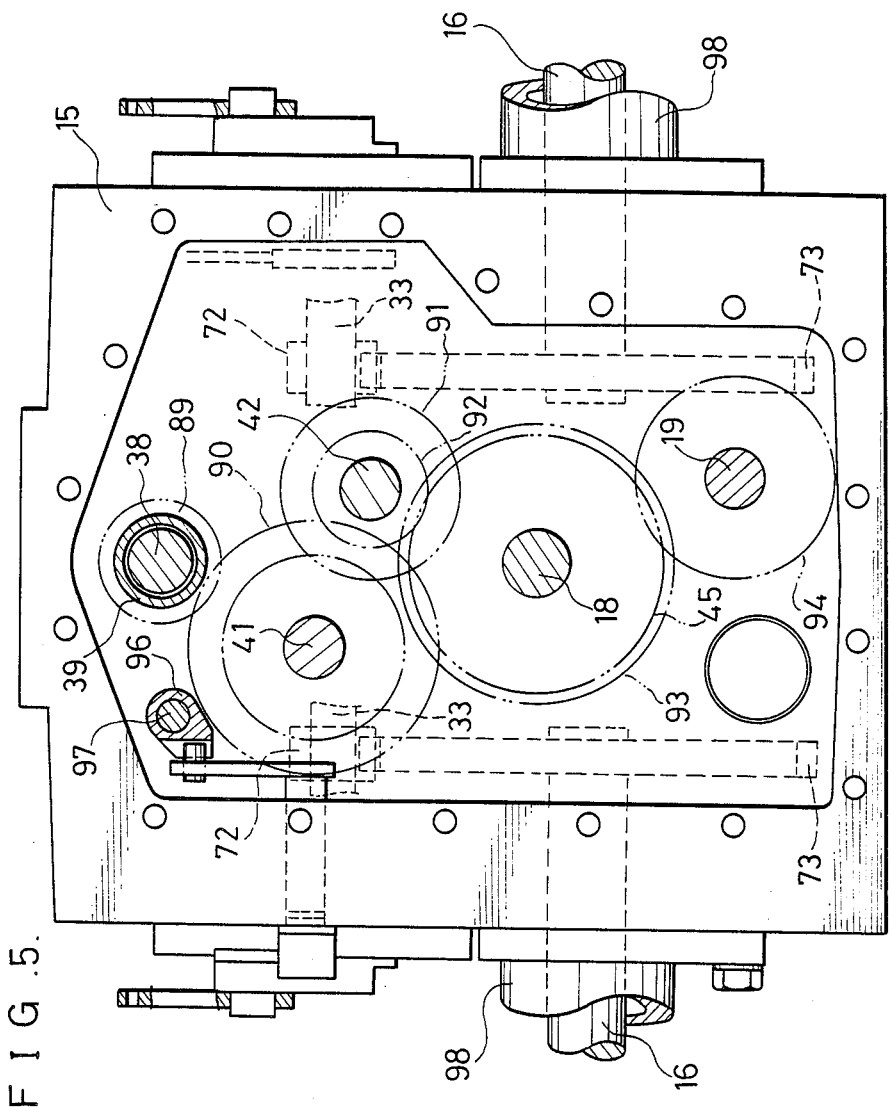
FIG. 5 is a sectional view, partially omitted, taken generally along line V—V of FIG. 2B.

A PTO-shaft drive assembly is arranged within the transmission casing 15 in a fashion which will be detailed hereinafter. As shown in FIGS. 2A, 2B and 5, a drive shaft 38 which is disposed co-axially with and coupled to the second input shaft 27 is arranged within the transmission casing 15 such that the drive shaft extends rearwardly from the transmission casing. As shown in FIGS. 2B and 5, a hollow clutch shaft 39 having fore and aft ends which are located respectively within and outside the transmission casing 15 is mounted rotatably on the drive shaft 38 and is connected to the drive shaft through a PTO-clutch 40 which is disposed at an outside location of the transmission casing. An intermediate shaft 41 which is connected drively to the clutch shaft 39 through a speed-reduction gearing 43 is disposed at a rear end portion within the transmission casing 15 and below the clutch shaft. On this intermediate shaft 41 are mounted a pair of freely rotatable first and second clutch gears 44 and 46 and a PTO-selecting clutch 47 which is disposed between the pair of first and second clutch gears for coupling these gears selectively to the intermediate shaft 41. The first clutch gear 44 is connected drivingly to the rear-PTO shaft 18 though a first gear train 44, 91, 92, 93, whereas the second clutch gear 46 is connected drivingly to the mid-PTO shaft 19 through a second gear train 46, 45, 94.

In the PTO-shaft drive assembly shown, the first gear train set forth above includes a pair of axially spaced gears 91 and 92 mounted on a second intermediate shaft 42 which is arranged at a rear end portion within the transmission casing 15 such that the second intermediate shaft 42 is spaced from the first intermediate shaft 41 in a direction across the transmission casing 15. The second gear train set forth above includes an idler gear 45 which is mounted rotatably on the rear-PTO shaft 18.

In a case where a hydrostatic transmission 14 mounted on the front of transmission casing 15 is provided in the transmission assembly according to the present invention, it is preferred to provide a drive shaft 29 which is disposed, as shown in FIG. 3, at a front portion within the transmission casing 15 and is coupled to the motor shaft 28 of hydrostatic transmission 14 so as to form an extension of the motor shaft. The change speed gearing 31 set forth before is disposed between such drive shaft 29 and the speed-change shaft 30 set forth before.

The structure set forth above permits the use of a standard hydrostatic transmission on the market as the hydrostatic transmission 14 shown by mounting same on the front of the transmission casing 15 in an inclined posture such as depicted in phantom in FIG. 4, as will be detailed later. The drive shaft 29 set forth above is preferably formed, as shown in FIG. 3, of a hollow shaft which is coupled at a front end portion thereof to the motor shaft 28 by means of a splined connection.

The transmission assembly according to the present invention is used in a self-propelled working vehicle for driving the vehicle with a variable speed by rotating the rear wheel axles 16 with a variable speed, for driving an implement drawn by the vehicle, such as a rotary tiller or grass collector, through the rear-PTO shaft 18, and for driving a mid-mount implement mounted between the front and rear wheels and below the vehicle frame structure, such as a mid-mount mower, through the mid-PTO shaft.

The PTO-selecting clutch 47 is used for driving each of the PTO shafts to rotate selectively. Before such PTO-selecting clutch is operated, the PTO-clutch 40 is disengaged for assuring an easy operation of the former clutch 47.

It is preferred to stop an inertial rotation of the clutch shaft 39 quickly after the PTO-clutch 40 has been disengaged. The PTO-clutch 40 shown is constructed as an electromagnetic clutch and includes a brake means 40c, 40d which is actuated by a spring 84 so as to brake the clutch shaft 39 when the PTO-clutch is disengaged.

As can be seen from FIGS. 2A and 2B, the PTO shaft drive assembly employed in the transmission assembly according to the present invention is arranged concentratedly at a rear end portion within the transmission casing 15 and only a single transmission shaft 38 of the PTO transmission line passes at a high level through a fronter portion within the transmission casing. As shown in FIG. 4, the first input shaft 28 for transmitting wheel-driving power into the transmission casing is located aside in a direction across the casing 15. Consequently, the speed-change shaft 30 may be located at substantially the level of the first input shaft 28 by arranging such change shaft aside in a direction across the transmission casing oppositely from the first input shaft. The present invention adopts such arrangement of the speed-change shaft 30 so as to highten the level of the change speed gearing 31 disposed between the first input shaft 28 and speed-change shaft 30.

Consequently, the height or vertical size of a front portion of the transmission casing 15 is largely reduced as compared to the case of the prior art transmission assembly referred to before. The high level arrangement of the speed-change shaft 30 also hightens the level of the differential gearing 32 driven by the change shaft and, therefore, the level of left and right output shafts 33 of such differential gearing. It is thus seen that the vertical distance between each output shaft 33 and each rear wheel axle 16 can be made large for disposing therebetween, as shown in FIG. 5 by dotted line, a speed-change gearing 34 composed of a pair of meshing spur gears which gearing is far inexpensive as compared to a speed-reduction planet gearing.

Because the PTO-clutch 40 having a substantial axial width is disposed according to the present invention at an outside location of the transmission casing 15, and because the PTO-selecting clutch 47 and gear trains for connecting this clutch to the rear-PTO shaft 18 and mid-PTO shaft 19 are disposed along a vertical direction concentratedly at a rear end portion within the transmission casing 15, axial length of the transmission casing is reduced largely as compared to the case of the prior art transmission assembly referred to before. Arrangement of the PTO-clutch on the rear of the transmission casing also permits an easy assemblage and maintenance of this clutch. Even though the PTO shaft drive assembly is arranged along a vertical direction at a rear end portion within the transmission casing 15, an enlargement in height or vertical size of such rear end portion of the transmission casing can be avoided by the laterally spaced arrangement of two shafts 41 and 42 shown in FIG. 5 and by the arrangement of an idler gear 45, shown in FIG. 2B, of the gear train for the mid-PTO shaft 19 on the rear-PTO shaft 18.

The inclined posture of the hydrostatic transmission 14 shown in FIG. 4 will locate the motor shaft of a standard hydrostatic transmission, having vertically aligned pump shaft 27 and motor shaft 28, aside in a direction across the transmission casing 15. The drive shaft 29 shown in FIG. 3 will provide an extension of the motor shaft 28 of a standard hydrostatic transmission. It is thus seen that the arrangement shown in FIGS. 5 and 3 permits to use a standard hydrostatic transmission on the market as the hydrostatic transmission 14 shown and, thus, contributes to save the manufacturing cost substantially.

DESCRIPTION OF A PREFERRED EMBODIMENT

As shown in FIG. 1, the present invention is embodied in a tractor of relatively small size which is equipped with a mid-mount mower M slung between front wheels 11 and rear wheels 2, below the vehicle frame.

An engine 13 is mounted on the front of the vehicle. Power is fed from this engine 13 to the pump shaft 27 of a hydrostatic transmission, referred to before, through a transmission shaft 17 having universal joints at both ends. The mid-PTO shaft 19 is used for transmitting mower-driving power to a gear box Ma of the mower M through a transmission shaft 20. The tractor shown is driven to travel by driving the left and right rear wheels 12, as already described before, and, when required or preferred, by also driving the left and right front wheels 11. To this end, an output shaft 36 for front wheel-driving power is provided which extends forwardly from the transmission casing 15 and transmits power into an axle case for the front wheels 11 through a transmission shaft 24.

As also shown in FIG. 1, a seat 21 is arranged above the transmission casing 15 and a steering wheel 22 for operating the front wheels 11 to turn is located before the seat 21. On the upper face of transmission casing 15 is mounted a hydraulic lift mechanism 48 having a pair of left and right lift arms 49 for lifting and lowering an implement, such as a rotary tiller or grass collector, which is connected to the rear of the vehicle and is driven by the rear-PTO shaft 19 referred to before.

As shown in FIG. 2A, the hydrostatic transmission 14 comprises a hydraulic pump 25 of the variable displacement type and a hydraulic motor 26 of the fixed displacement type which are arranged in parallel by placing the pump 25 above the motor 26. This hydrostatic transmission 14 is mounted on a front cover 50 of the transmission casing 15 with the inclined posture set forth before and shown in phantom in FIG. 5 so that the pump shaft 27 and motor shaft 28 thereof project towards the inside of transmission casing 15 with the arrangement set forth before and shown in FIG. 4. A hydrostatic transmission having a standard structure on the market is employed for the hydrostatic transmission 14 shown. For supplementing the length of motor shaft 28 of such hydrostatic transmission, the drive shaft 29 set forth before and shown in FIG. 3 is used which is made hollow for an easy machining of splines for a splined connection with the motor shaft.

As shown in FIGS. 2A and 2B, a pair of support walls 51 and 52 are formed in the transmission casing 15 at fronter and rearer sides of the differential gearing 32 set forth before. As shown in FIG. 2B, a rear end opening of the transmission casing 15 is covered by a rear end cover 53. As shown in FIGS. 2A and 4, a front end portion of the transmission casing 15 has a bottom wall disposed at a higher level than that of the remainder of the casing 15 and the mid-PTO shaft 19 is projected forwardly at a location below such front end portion of the transmission casing.

The wheel drive assembly within the transmission casing 15 will now be detailed. As shown in FIGS. 3 and 4, the change speed gearing 31 set forth before comprises two change speed gear trains composed of two gears 55 and 56, mounted rotatably on the drive shaft 29, and two gears 57 and 58 mounted fixedly on the aforestated speed-change shaft 30 and meshed respectively with the gears 55 and 56. On the drive shaft 29 and between the gears 55 and 56 is slidably disposed a shifter sleeve 59 for coupling each of the gears 55 and 56 selectively to the drive shaft 29. The shifter sleeve 59 is displaced for a gear coupling purpose using a shifting mechanism which includes a shifter fork 61 guided by a fork shaft 60 as shown in FIG. 4.

As shown in FIG. 3, the speed-change shaft 30 has at its rear end an integral bevel gear 62 with which a larger input bevel gear 63 of the differential gearing 63 set forth before is meshed so as to drive the gearing 63 by the change shaft 30. In the differential gearing 32 shown, a pinion shaft 64 for supporting a pair of drive pinions is received at both ends thereof in grooves 65 formed in the input bevel gear 63 so as to eliminate a differential casing from the gearing 32. The input bevel gear 63 is rotatably supported through a bearing 66 by a semi-cylindrical support wall portion 67 which is formed in the transmission casing 15 so as to embrace the bearing 66 from the underside thereof within an interval between the support walls 51 and 52. A separate semi-cylindrical support member 68 shown in FIG. 2B is placed on the upper face of the support wall portion 6 and is secured thereto using bolts 69 shown in FIGS. 2A, 2B and 3.

As shown in FIG. 3, left and right output shafts 33 of the differential gearing 32 have end portions projected into left and right brake casings 70 which are formed integrally with the transmission casing 15 so as to project sidewards from the casing 15. On the output shaft 33 of one side is mounted non-rotatably but slidably a lock-up clutch member 71 which is operable to couple the input bevel gear 63 selectively to the output shaft 33 so as to disactuate the differential gearing 32. Each of the left and right speed-reduction gearings 34 set forth before comprises a smaller spur gear 72, formed integrally with each of the output shafts 33, and a larger spur gear 73 fixedly mounted on each of the rear wheel axles 16 and meshed with the smaller gear 72.

As shown in FIG. 4, the output shaft 36 for front wheel-driving power referred to before is arranged at a front portion within the transmission casing 15 in a fashion such that it extends forwardly from the transmission casing at a location which is spaced sidewards from a lower end portion of the inclination of the hydrostatic transmission 14. An intermediate shaft 37 is disposed at a front portion within the transmission casing 15 at a level between the levels of the speed-change shaft 30 and output shaft 36. As shown in FIGS. 3 and 4, the intermediate shaft 37 is drivenly connected to the change shaft 30 by meshing together gears 75 and 76 which are fixedly mounted on these shafts. The intermediate shaft has thereon another co-rotatable gear 76 which is meshed with a gear mounted rotatably on the output shaft 77. On the output shaft 77 is mounted slidably but non-rotatably a clutch sleeve 78 which is operable to couple the gear 77 selectively to the output shaft 36. The clutch sleeve 78 constituting a shiftable member of a front wheel-driving clutch is operated to slide using an operating mechanism which includes a shifter 79 shown in FIG. 4.

As shown in FIG. 3, the left and right brake casings 70 include therein left and right brakes 35 for braking selectively the left and right differential output shafts 33. Each of the brakes 35 is constructed as a frictional multi-disk type having one and another plurality of frictional disks which are supported non-rotatably by the shaft 33 and casing 70, respectively. Each brake 35 includes a pressure plate 35a for thrusting the frictional disks, a control shaft 35c operable to displace rotationally the pressure plate 35a so as to cause a sliding displacement of such pressure plates towards the frictional disks through a cam mechanism including a ball 35b shown, and a spring 35d for biasing the pressure plate 35a to move away from the frictional disks.

The PTO shaft drive assembly will now be detailed by referring to FIGS. 2A, 2B and 5.

As shown in FIG. 2A, the drive shaft 38 set forth before is coupled at its front end to the pump shaft 27 using a splined coupling 80. As shown in FIG. 2B, the drive shaft 38 has a rear end portion, located rearwardly of the transmission casing 15, on which a casing member 40a of the PTO-clutch 40 set forth before is fixedly mounted using a key 81. The PTO-clutch 40 is constructed as an electromagnetic clutch comprising a coil member 40b which is disposed within the casing member 40a. A movable clutch plate 40c is disposed in front of the casing member 40a and is connected through a leaf spring 84 to a disk 83 which is secured to a flanged end portion 39a of the hollow clutch shaft 39, set forth before, using bolts 82. The leaf spring 84 biases the movable clutch disk 40c to move away from the casing member 40a. On the rear of the casing member 40a is disposed a cover plate 85 which is fixed in position. In front of the movable clutch plate 40c is disposed an annular brake plate 40d which is supported by the cover plate 85 through blots 86 one of which is shown in FIG. 2B. Each bolt 86 has thereon an adjusting nut 88 upon which the brake plate 40d abuts from the rear under a biasing of a coil spring 87 disposed around the bolt 86. Consequently, position of the brake plate 40d may be varied or adjusted axially of the PTO-clutch 40 by varying the position of the adjusting nut 88 on the bolt 86.

When the coil member 40b is energized so as to draw the movable clutch plate 40c and thereby to cause an engagement of the clutch plate with the casing member 10a, the electromagnetic PTO-clutch 40 is brought into an engaged condition where the clutch plate 40c is rotated in unison with the drive shaft 38 and casing member 10a and where rotation of the clutch plate 40c is transmitted to the clutch shaft 39 via the leaf spring 84 and disk 83. When the coil member 40b is de-energized, the movable plate member 40c is engaged with the brake plate 40d under the biasing of leaf spring 84 so that an inertial rotation of the clutch shaft 39 is stopped quickly. Timing of the operation of the brake mechanism composed of a combination of the clutch plate 40c and brake plate 40d may be adjusted by adjusting the position of brake plate 40d by means of nut 88.

As shown in FIG. 2B, the first and second intermediate shafts 41 and 42 referred to before are supported respectively by the support wall 52 and rear end cover 53. As shown in FIG. 5, these intermediate shafts are disposed between the clutch shaft 39 and rear-PTO shaft 18, as viewed in a vertical direction, with arranging the second intermediate shaft 42 at a level somewhat lower than that of the first intermediate shaft 41. As shown in FIGS. 2B and 5, the aforestated speed-reduction gearing disposed between the clutch shaft 39 and first intermediate shaft 41 comprises a smaller spur gear 89, formed integrally with the clutch shaft 39, and a larger spur gear 90 mounted non-rotatably on the first intermediate shaft 41 and meshed with the smaller spur gear. The smaller spur gear 89 is sized such that an inner end portion of the clutch shaft 39 having thereon such gear 89 may be inserted into the transmission casing 15 through an opening in the rear end cover 53.

Of the aforestated first and second clutch gears 44 and 46 mounted rotatably on the first intermediate shaft 41, the first clutch gear 44 is meshed with a gear 91 mounted fixedly on the second intermediate shaft 42 which in turn is connected drivingly to the rear-PTO shaft 18 by meshing a smaller gear 92, formed integrally with the second intermediate shaft, with a larger gear 93 fixedly mounted on the rear-PTO shaft. The second clutch gear 46 on the first intermediate shaft 41 is meshed with the aforestated idler gear 45, mounted rotatably on the rear-PTO shaft, which in turn is meshed with a gear 94 mounted fixedly on the mid-PTO shaft 19. As can be seen from FIG. 5, gears 45 and 93 on the rear-PTO shaft 18 are disposed between the left and right larger gears 73 mounted on the left and right rear wheel axles 16.

As shown in FIG. 2B, the PTO-selecting clutch 47 set forth before comprises a shiftable clutch sleeve 95 mounted on the first intermediate shaft 41. The structure of this PTO-selecting clutch is substantially the same as that of the one disclosed in U.S. Pat. No. 4,579,183 referred to before. The clutch sleeve 95 is thus shifted selectively to a position shown in FIG. 2B where both of the clutch gears 44 and 46 are coupled to the first intermediate shaft 41, a forwardly located position where only the first clutch gear 44 is coupled to the first intermediate shaft, and a rearwardly located position where only the second clutch gear 46 is coupled to the first intermediate shaft. In FIG. 5, numeral 96 designates a part of a shifter fork which is guided by a fork shaft 97 and is engaged with the clutch sleeve 95 for shifting same.

As is usual, left and right axle housings 98 shown in FIGS. 3 to 5 are attached to the transmission casing 15 for covering left and right rear wheel axles 16 and for supporting respective outer end portions of these wheel axles. In FIG. 2B, numeral 99 designates a control valve assembly for the hydraulic lift mechanism 48 shown in FIG. 1. This valve assembly 99 is secured to the lower surface of the cylinder case of lift mechanism 48 and is located at an uppermost portion within the transmission casing 15. In FIG. 2B, numeral 100 designates a retainer plate which is secured to the outer end face of the drive shaft 38 using a releasable retainer bolt 101. It is designed that the PTO-clutch 40 and clutch shaft 39 may be removed from the drive shaft 38 for an inspection and maintenance purpose by releasing the retainer bolt 101.

I claim:

1. In a self-propelled working vehicle, wherein axles of left and right rear wheels are supported rotatably by a transmission casing disposed between said left and right rear wheels, said transmission casing including therein a rear-PTO shaft, which extends rearwardly from the transmission casing at a mid level of the casing, and a mid-PTO shaft which extends forwardly from the transmission casing at a low level of the casing, a transmission assembly characterized in:

that there are provided at a front end portion of said transmission casing (15) a first input shaft (28) for transmitting wheel-driving power into the casing and a second input shaft (27) for transmitting PTO shaft-driving power into the casing, said second input shaft being disposed at a level higher than that of said first input shaft and said first input shaft being located aside in a direction across the transmission casing;

that a speed-change shaft (30) is arranged at a front portion within said transmission casing (15) in a fashion such that said change shaft is located aside in a direction across the transmission casing oppositely from said first input shaft (28) at a level substantially equal to the level of the said input shaft, a change speed gearing (31) being disposed between said first input shaft and said change shaft and a differential gearing (32), drivenly connected to said change shaft, being disposed rearwardly of said change speed gearing, left and right output shafts (33) of said differential gearing being drivingly connected respectively to said left and right rear wheel axles (16) through speed-reduction gearings (34) which are disposed at left and right end portions within said transmission casing; and that a drive shaft (38), co-axial with and coupled to said second input shaft (27), is arranged within said transmission casing (15) such that said drive shaft extends rearwardly from the casing, a hollow clutch shaft (39) having fore and aft ends located respectively within and outside the transmission casing being mounted rotatably on said drive shaft and being connected drivenly to said drive shaft through a PTO-clutch (40) which is disposed at an outside location of the transmission casing, a first intermediate shaft (41) connected drivenly to said clutch shaft through a speed-reduction gearing (43) being disposed at a rear end portion within the transmission casing and below said clutch shaft, said intermediate shaft having thereon a pair of freely rotatable first and second clutch gears (44, 46) and a PTO-selecting clutch (47) disposed between said pair of first and second clutch gears for coupling said clutch gears selectively to said intermediate shaft, said first clutch gear being connected drivingly to said rear-PTO shaft (18)

through a first gear train (44, 91, 92, 93) and said second clutch gear being connected drivingly to said mid-PTO shaft (19) through a second gear train (46, 45, 94).

2. A transmission assembly as claimed in claim 1, wherein an output shaft (36) for front wheel-driving power extending forwardly from said transmission casing (15) is arranged at a front portion and at a low level within the transmission casing, said output shaft being connected drivenly to said speed-change shaft (30) via an intermediate shaft (37) which is disposed at a front portion within the transmission casing at a level between levels of said change shaft and said output shaft.

3. A transmission assembly as claimed in claim 2, wherein a main change speed mechanism (14) for varying wheel-driving speed is mounted on a front of said transmission casing (15) at a location spaced respectively from said mid-PTO shaft (19) and from said output shaft (36), said main change speed mechanism having an input shaft, extending rearwardly into the transmission casing, and a speed-change output shaft extending into the transmission casing, said second input shaft (27) being provided by said input shaft of said main change speed mechanism and said first input shaft (28) being provided by said speed-change output shaft.

4. A transmission assembly as claimed in claim 3, wherein said change speed gearing (31) is arranged between a drive shaft (29) and said speed-change shaft (30), the said drive shaft being disposed co-axially with said first input shaft (28) at a front portion within said transmission casing (15) and being coupled to said first input shaft.

5. A transmission assembly as claimed in claim 1, wherein left and right brakes (35) for braking said left and right output shafts (33) of said differential gearing (32) are associated to respective free ends of the said output shafts.

6. A transmission assembly as claimed in claim 1, wherein said PTO-clutch (40) is constructed as an electromagnetic clutch and includes a brake means (40c, 40d) which is actuated by a spring (84) so as to brake said clutch shaft (39) when said PTO-clutch is disengaged.

7. A transmission assembly as claimed in claim 1, wherein a second intermediate shaft (42) spaced from said first intermediate shaft (41) in a direction across said transmission casing (15) is arranged at a rear end portion within the transmission casing, said first gear train including axially spaced two gears (91, 92) mounted on said second intermediate shaft, whereas said second gear train includes an idler gear (45) mounted rotatably on said rear-PTO shaft (18).

8. A transmission assembly as claimed in claim 7, wherein said PTO-selecting clutch (47) is fashioned such that it may couple said first and second clutch gears (44, 46) at a same time to said first intermediate shaft (41).

9. In a self-propelled working vehicle, wherein axles of left and right rear wheels are supported rotatably by a transmission casing disposed between said left and right rear wheels, said transmission casing including therein a rear-PTO shaft, which extends rearwardly from the transmission casing at a mid level of the casing, and a mid-PTO shaft which extends forwardly from the transmission casing at a low level of the casing, a transmission assembly characterized in:
that a hydrostatic transmission (14) is mounted on a front of said transmission casing (15) at an upper side of said mid-PTO shaft (19), said hydrostatic transmission having a motor shaft (28), which is located aside in a direction across the transmission casing within a width of the casing, and a pump shaft (27) which is disposed at a level higher than that of said motor shaft, said motor shaft and said pump shaft extending into said transmission casing;
that there are arranged at a front portion within said transmission casing (15) a first drive shaft (29), disposed co-axially with and coupled to said motor shaft (28), and a speed-change shaft (30), located aside in a direction across the transmission casing oppositely from said motor shaft, in a fashion such that said change shaft extends parallel with said drive shaft at a level substantially equal to that of said drive shaft, a change speed gearing (31) being disposed between said first drive shaft and said speed-change shaft and a differential gearing (32) being arranged rearwardly of said change speed gearing, said differential gearing being connected drivenly to said speed-change shaft and having left and right output shafts (33) which are drivingly connected respectively to said left and right rear wheel axles (16) through speed-reduction gearings (34) disposed at left and right end portions within the transmission casing; and
that a second drive shaft (38), co-axial with and coupled to said pump shaft (27), is arranged within said transmission casing (15) such that said second drive shaft extends rearwardly from the transmission casing, a hollow clutch shaft (39) which has fore and aft ends located respectively within and outside the transmission casing being mounted rotatably on said second drive shaft and being connected drivenly to said second drive shaft through a PTO-clutch (40) which is disposed at an outside location of the transmission casing, an intermediate shaft (41) connected drivenly to said clutch shaft through a speed-reduction gearing (43) being disposed at a rear end portion within the transmission casing and below said clutch shaft, said intermediate shaft having thereon a pair of freely rotatable first and second clutch gears (44, 46) and a PTO-selecting clutch (47) disposed between said pair of first and second clutch gears for coupling said clutch gears selectively to said intermediate shaft, said first clutch gear being connected drivingly to said rear-PTO shaft (18) through a first gear train (44, 91, 92, 93) and said second clutch gear being connected drivingly to said mid-PTO shaft (19) through a second gear train (46, 45, 94).

10. A transmission assembly as claimed in claim 9, wherein said hydrostatic transmission (14) is mounted on the front of said transmission casing (15) in a posture inclined in a direction across the transmission casing.

11. A transmission assembly as claimed in claim 10, wherein said first drive shaft (29) is formed of a hollow shaft which is coupled at a front end portion thereof to said motor shaft (28) by means of a splined connection.

12. A transmission assembly as claimed in claim 10, wherein an output shaft (36) for front wheel-driving power is arranged at a front portion within said transmission casing (15) in a fashion such that it extends forwardly from the transmission casing at a location spaced sidewards from a lower end portion of inclination of said hydrostatic transmission (14), the said output shaft being connected to said speed-change shaft (30) via an intermediate shaft (37) which is disposed at a front portion within the transmission casing at a level between levels of said change shaft and the said output shaft.

* * * * *